H. O. WIEMANN.
LICENSE INDICATOR.
APPLICATION FILED APR. 20, 1920.

1,378,640.

Patented May 17, 1921.

Herbert O. Wiemann
INVENTOR.

BY
ATTORNEYS

UNITED STATES PATENT OFFICE.

HERBERT O. WIEMANN, OF CHESTERTON, INDIANA.

LICENSE-INDICATOR.

1,378,640. Specification of Letters Patent. Patented May 17, 1921.

Application filed April 20, 1920. Serial No. 375,314.

*To all whom it may concern:*

Be it known that I, HERBERT O. WIEMANN, a citizen of the United States, residing at Chesterton, in the county of Porter and State of Indiana, have invented new and useful Improvements in License-Indicators, of which the following is a specification.

This invention relates to license indicators for motor cars and like vehicles and its object is to provide an indicator which renders the license number clearly legible at a considerable distance by night or by day.

Another object of the invention is to embody in the indicator a tail-light element as a substitute for the usual tail lamp.

With the above objects in view, the invention consists in a novel combination and arrangement of parts to be described and claimed hereinafter, reference being had to the accompanying drawing, in which—

Figure 1:
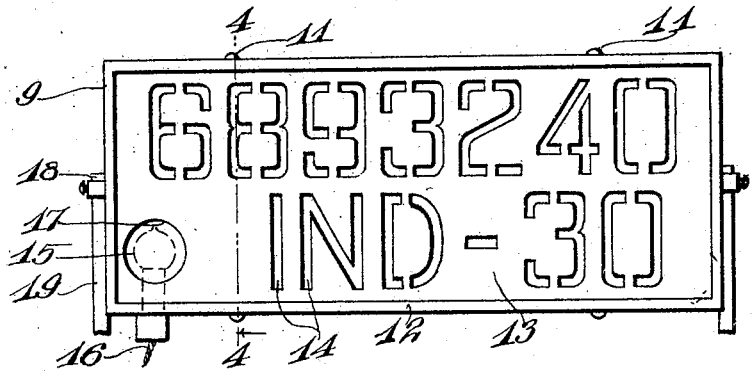
Figure 1 is an elevation of the indicator, as viewed from the rear of the vehicle.
Figure 2:
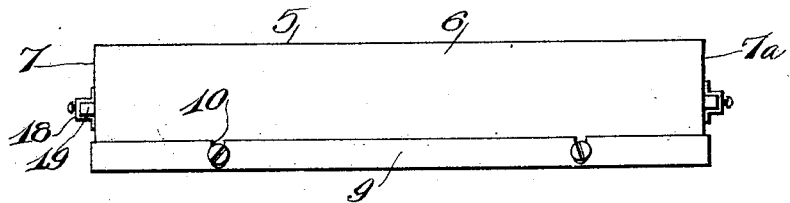
Fig. 2 is a plan view.
Figure 3:
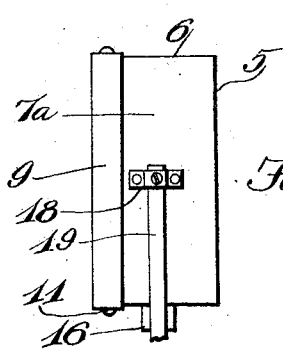
Fig. 3 is an end view.
Figure 4:
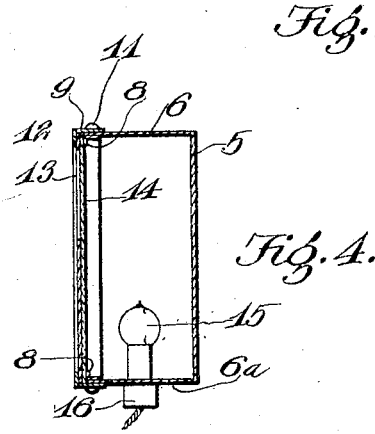
Fig. 4 is a section on the line 4—4 of Fig. 1.

Referring specifically to the drawing, the indicator is in the form of an elongated metal casing 5, having top and bottom walls 6 and 6ª, and end walls 7 and 7ª. The front of the casing is open, and its marginal edge is turned in flatly to reinforce the stock, some portions, such as 8, being however allowed to project into the plane of the opening.

Over the open side of the casing is adapted to be fitted a frame 9, whose top and bottom sections are cut with slots 10 to fit beneath the heads 11 of screws passed into the walls 6 and 6ª, the tightening of the screws serving to fasten the frame to the casing. The frontal edge 12 of the frame is narrow, and of a width corresponding with the height of the casing portions 8.

Immediately behind the frame 9 is positioned a sheet metal plate 13 painted a dark color and stenciled with the license number; and next behind the plate 9 is a plate 14 of glass. The bottom of the casing is fitted near one end thereof with an electric lamp 15, which has suitable connections 16 for receiving current from a battery or generator carried by the vehicle. The slots 10 enable the frame 9 to be adjusted to the thickness of the plates, so that they may be held fast with casing portions 8 as a backing.

The stencil plate 13 has a cut-out portion 17 opposite the lamp 15, and that part of the glass plate 14 which is disclosed thereat is colored red. The balance of the plate 14 is of opal glass, or painted white.

It will be seen that the present indicator serves both as a license plate and a tail light. During the day, when the lamp is not in use, the white license number will stand out clearly against the dark background of the plate 13; and at night the effect will be intensified by the light from within the same shining strongly through the red-tinted glass, and thus serving as a tail light. The device is of simple construction, and could be manufactured economically.

The end walls 7 and 7ª of the casing are made with ears 18 for supporting brackets 19 extending from the body of the vehicle, or may be readily adapted to any other style of connections that may be considered suitable.

I claim—

A license indicator comprising a casing having an open front, a frame fitted over the latter and composed of top, bottom and side sections, a stenciled license plate within the frame, a translucent plate behind the license plate, backing abutments for the latter, and screws entering opposite walls of the casing, corresponding walls of the frame having slots through which the screws pass, said slots running in a direction transverse of the casing and rendering the frame adjustable to the thickness of the license and translucent plates.

In testimony whereof I affix my signature.

HERBERT O. WIEMANN.